US007487819B2

(12) United States Patent
Wang et al.

(10) Patent No.: US 7,487,819 B2
(45) Date of Patent: *Feb. 10, 2009

(54) DISPOSABLE THIN WALL CORE DIE, METHODS OF MANUFACTURE THEREOF AND ARTICLES MANUFACTURED THEREFROM

(75) Inventors: Hsin-Pang Wang, Rexford, NY (US); Marc Thomas Edgar, Glenmont, NY (US); John Thomas Leman, Niskayuna, NY (US); Ching-Pang Lee, Cincinnati, OH (US); Eric Alan Estill, Morrow, OH (US)

(73) Assignee: General Electric Company, Niskayuna, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 11/609,117

(22) Filed: Dec. 11, 2006

(65) Prior Publication Data

US 2008/0135722 A1 Jun. 12, 2008

(51) Int. Cl.
*B22C 9/04* (2006.01)
*B22C 9/10* (2006.01)
(52) U.S. Cl. .......................... 164/28; 164/369
(58) Field of Classification Search .......... 164/516–519
See application file for complete search history.

(56) References Cited

U.S. PATENT DOCUMENTS

| | | |
|---|---|---|
| 3,220,972 A | 11/1965 | Lamoreaux |
| 3,516,946 A | 6/1970 | Modic |
| 3,715,334 A | 2/1973 | Karstedt |
| 3,775,452 A | 11/1973 | Karstedt |
| 4,288,345 A | 9/1981 | Ashby et al. |
| 4,323,756 A | 4/1982 | Brown et al. |
| 4,421,903 A | 12/1983 | Ashby |
| 4,724,299 A | 2/1988 | Hammeke |

(Continued)

FOREIGN PATENT DOCUMENTS

EP   1016639   7/2000

(Continued)

OTHER PUBLICATIONS

Harvey et al; Non-Axisymmetric Turbine End Wall Design: Part 1 Three-Dimensional Linear Design System; ASME Paper; 99-GT-337; Presented at the International Gas Turbine & Aeroengine Congress & Exhibition, Indianapolis, Indiana; 8 pages; Jun. 7-Jun. 10, (1999 ).

(Continued)

*Primary Examiner*—Kuang Lin
(74) *Attorney, Agent, or Firm*—Penny A. Clarke (57) ABSTRACT

Disclosed herein is a method comprising injecting into a thin wall disposable core die a slurry having a viscosity of about 1 to about 1,000 Pascal-seconds at room temperature when tested at a shear rate of up to 70 seconds$^{-1}$ and a flow index of less than 0.6 at a pressure of up to about 7 kilograms-force per square centimeter; wherein the thin wall disposable core die has an average wall thickness of about 1.5 to about 10 millimeters; curing the slurry to form a cured ceramic core; removing the thin wall disposable core die from the cured ceramic core; and firing the cured ceramic core to form a solidified ceramic core.

10 Claims, 5 Drawing Sheets

Rapid Prototyping Formed Disposable Thin-Wall Core Mold

U.S. PATENT DOCUMENTS

| | | | |
|---|---|---|---|
| 4,730,093 | A | 3/1988 | Mehta et al. |
| 5,014,763 | A | 5/1991 | Frank |
| 5,038,014 | A | 8/1991 | Pratt et al. |
| 5,043,548 | A | 8/1991 | Whitney et al. |
| 5,126,082 | A | 6/1992 | Frank |
| 5,337,568 | A | 8/1994 | Lee et al. |
| 5,397,215 | A | 3/1995 | Spear et al. |
| 5,931,638 | A | 8/1999 | Krause et al. |
| 6,017,186 | A | 1/2000 | Hoeger et al. |
| 6,254,334 | B1 | 7/2001 | LaFleur |
| 6,269,540 | B1 | 8/2001 | Islam et al. |
| 6,283,713 | B1 | 9/2001 | Harvey et al. |
| 6,338,609 | B1 | 1/2002 | Decker et al. |
| 6,379,528 | B1 | 4/2002 | Lee et al. |
| 6,402,464 | B1 | 6/2002 | Chiu et al. |
| 6,419,446 | B1 | 7/2002 | Kvasnak et al. |
| 6,429,402 | B1 | 8/2002 | Dixon et al. |
| 6,502,622 | B2 | 1/2003 | Lee et al. |
| 6,504,127 | B1 | 1/2003 | McGregor et al. |
| 6,511,294 | B1 | 1/2003 | Mielke et al. |
| 6,546,730 | B2 | 4/2003 | Johnson et al. |
| 6,561,761 | B1 | 5/2003 | Decker et al. |
| 6,626,230 | B1 | 9/2003 | Woodrum et al. |
| 6,669,445 | B2 | 12/2003 | Staubach et al. |
| 6,974,308 | B2 | 12/2005 | Halfmann et al. |
| 7,134,842 | B2 | 11/2006 | Tam et al. |
| 2001/0024000 | A1 | 9/2001 | Lee et al. |
| 2005/0006047 | A1 | 1/2005 | Wang et al. |
| 2005/0070651 | A1 | 3/2005 | McNulty et al. |
| 2005/0156361 | A1 | 7/2005 | Holowczak et al. |
| 2005/0205232 | A1 | 9/2005 | Wang et al. |
| 2006/0065383 | A1 | 3/2006 | Oritz et al. |
| 2006/0153681 | A1 | 7/2006 | Lee |
| 2006/0233641 | A1 | 10/2006 | Lee et al. |
| 2006/0275112 | A1 | 12/2006 | Lee et al. |
| 2007/0003416 | A1 | 1/2007 | Bewlay et al. |

FOREIGN PATENT DOCUMENTS

| | | |
|---|---|---|
| EP | 1495820 | 1/2005 |
| EP | 1552913 | 7/2005 |

OTHER PUBLICATIONS

Krauss et al; "Rheological Properties of Alumina Injection Feedstocks"; Materials Research; 8; pp. 187-189; (2005).

Sieverding; "Secondary Flows in Straight and Annular Turbine Cascades"; in Thermodynamics and Fluid Mechanics of Turbomachinery, vol. II; Eds. A.S. Ucer, P. Stow, and Ch. Hirsch; NATO ASI Series; Martinus Nijhoff Publishers; pp. 621-664; (1985).

Shih et al; "Controlling Secondary-Flow Structure by Leading-Edge Airfoil Fillet and Inlet Swirl to Reduce Aerodynamic Loss and Surface Heat Transfer"; Transactions of the ASME; 125; pp. 48-56; Jan. (2003).

Takeishi et al; "An Experimental Study of the Heat Transfer and Film Cooling on Low Aspect Ratio Turbine Nozzles"; The American Society of Mechanical Engineers, 345 E. 47$^{th}$ St., New York, N.Y. 10017; ASME Paper 89-GT-187; Presented at the Gas Turbine and Aeroengine Congress and Exposition, Jun. 4-8, Toronto, Ontario Canada; 9 pages (1989).

Theiler, et al.; "Deposition of Graded Metal Matrix Composites by Laser Beam Cladding"; BIAS Bremen Institute of Applied Beam Technology, Germany; http://www.bias.de/WM/Publikationen/Deposition%20of%20graded.pdf; 10 pages; Jun. 2005.

U.S. Appl. No. 11/256,823, filed Oct. 24, 2005; "Ceramic-Based Molds for Industrial Gas Turbine Metal Castings Using Gelcasting"; Huang et al.

U.S. Appl. No. 11/540,741, filed Sep. 29, 2006; "Turbine Angel Wing Sealing Using Surface Depression Treatment"; Bunker, Ronald Scott.

U.S. Appl. No. 11/240,837, filed Sep. 30, 2006; "Methods for Making Ceramic Casting Cores and Related Articles and Processes"; H.P. Wang et al.

U.S. Appl. No. 11/567,409, filed Dec. 6, 2006; "Casting Compositions For Manufacturing Metal Castings and Methods of Manufacturing Thereof"; Hsin-Pang Wang et al.

U.S. Appl. No. 11/567,443, filed Dec. 6, 2006; "Disposable Insert, and Use Thereof in a Method for Manufacturing an Airfoil"; Ching-Pang Lee.

U.S. Appl. No. 11/567,477, filed Dec. 6, 2006; "Composite Core Die, Methods of Manufacture Thereof and Articles Manufactured Therefrom"; Ching-Pang Lee et al.

U.S. Appl. No. 11/567,521, filed Dec. 6, 2006; "Ceramic Cores, Methods of Manufacture Thereof and Articles Manufactured From the Same"; Chin-Pang Lee.

U.S. Appl. No. 11/635,749, filed Dec. 7, 2006; "Processes for the Formation of Positive Features on Shroud Components, and Related Articles"; Ching-Pang Lee.

U.S. Appl. No. 11/609,150, filed Dec. 11, 2006; "Method of Modifying the End Wall Contour in a Turbine Using Laser Consolidation and the Turbines Derived Therefrom" Ching-Pang Lee et al.

EP Search Report, EP 07121789, Mar. 18, 2008.

J. C. Ferreri, "Manufacturing core-boxes for foundry with rapid tooling technology," Journal of Materials Processing Technology, vol. 155-156, 2000, pp. 1118-1123.

F. Jorge Lino et al., "Ceramic components for foundry industry," Journal of Materials Processing Technology, vol. 142, 2003, pp. 628-633.

B. Mueller et al., Laminated object manufacturing for rapid tooling and patternmaking in foundry industry, vol. 38, 1999, pp. 47-53.

FIG. 5

DISPOSABLE THIN WALL CORE DIE, METHODS OF MANUFACTURE THEREOF AND ARTICLES MANUFACTURED THEREFROM

BACKGROUND

This disclosure relates to a disposable thin wall core die, methods of manufacture thereof and articles manufactured therefrom.

Components having complex geometry, such as components having internal passages and voids therein, are difficult to cast using current commercial methods; tooling for such parts is both expensive and time consuming, for example, requiring a large lead-time. This situation is exacerbated by the nature of conventional molds comprising a shell and one or more separately formed cores, wherein the core(s) are prone to shift during casting, leading to low casting tolerances and low casting efficiency (yield). Examples of components having complex geometries that are difficult to cast using conventional methods include hollow airfoils for gas turbine engines, and in particular relatively small, double-walled airfoils. Examples of such airfoils for gas turbine engines include rotor blades and stator vanes of both turbine and compressor sections, or any parts that need internal cooling.

In current methods for casting hollow parts, a ceramic core and shell are produced separately. The ceramic core (for providing the hollow portions of the hollow part) is first manufactured by pouring a slurry that comprises a ceramic into a metal core die. After curing and firing, the slurry is solidified to form the ceramic core. The ceramic core is then encased in wax and a ceramic shell is formed around the wax pattern. The wax that encases the ceramic core is then removed to form a ceramic mold. The ceramic mold is then used for casting metal parts.

The slurry used to manufacture the ceramic core generally has a relatively high viscosity of about $10^5$ to about $10^8$ Pascal-seconds (Pa-s) when measured at room temperature. In order to ensure that the high viscosity slurry fills up all of the channels and interstices present in the metal core die, pressures greater than or equal to about 35 kilogram-force per square centimeter are used to inject the slurry into the core die. The use of such large pressures promotes the use of metal core dies having wall thickness of greater than or equal to about 15 millimeters. Such metal core dies are heavy, expensive to produce and the method of production is generally time-consuming. It is therefore desirable to improve the core die design so that core dies that are lighter in weight than the metal core dies can be produced. It is also desirable for these core dies to have thin walls that take advantage of low viscosity slurries (and hence lower operating pressures) for producing structures that have complex internal shapes.

SUMMARY

Disclosed herein is a method comprising injecting into a thin wall disposable core die a slurry having a viscosity of about 1 to about 1,000 Pascal-seconds at room temperature when tested at a shear rate of up to 70 seconds$^{-1}$ and a flow index of less than 0.6 at a pressure of up to about 7 kilograms-force per square centimeter; wherein the thin wall disposable core die has an average wall thickness of about 1.5 to about 10 millimeters; curing the slurry to form a cured ceramic core; removing the thin wall disposable core die from the cured ceramic core; and firing the cured ceramic core to form a solidified ceramic core.

Disclosed herein too is a core die comprising walls having a thickness of about 1.5 to about 10 millimeters; wherein the walls comprise a polymer and has a strength effective to resist permanent deformation by a hydrostatic pressure of about 0.07 to about 7 kilograms-force per square centimeter.

DETAILED DESCRIPTION

Disclosed herein are thin wall disposable core dies that have wall thicknesses of about 1.5 to about 10 millimeters. The wall thickness of the thin wall disposable core dies is effective to withstand pressures applied to a low viscosity slurry in order to enable the slurry to flow into all of the channels and interstices of the disposable core die. Moreover, the thin walls of the disposable core have an elastic modulus and a flexural strength effective to withstand the applied pressures without any permanent deformation. In one embodiment, the thin walls of the disposable core have an elastic modulus and a flexural strength effective to withstand the applied pressures without any deformation.

These thin wall disposable core dies are advantageously manufactured from an organic polymer and can be rapidly manufactured in a rapid prototyping process. The thin wall disposable core dies can be easily removed from the ceramic core after the manufacture of the ceramic core. Removal is generally accomplished by chemical, thermal or mechanical processes.

In one embodiment, the method of manufacturing a component using the thin wall disposable core die comprises pouring a low viscosity slurry into the thin wall disposable core die. The slurry is then cured to form a cured ceramic core. The thin wall disposable core die is then removed from the cured ceramic core and the cured ceramic core is then fired to produce a solidified ceramic core.

The solidified ceramic core is then disposed inside a wax die. The wax die is made from a metal. Wax is injected between the solidified ceramic core and the metal wax die and allowed to cool. The wax die is then removed leaving behind a wax component with the ceramic core enclosed therein. The wax component is then subjected to an investment casting process wherein it is repeatedly immersed into a ceramic slurry to form a ceramic slurry coat whose inner surface corresponds in geometry to the outer surface of the desired component. The wax component disposed inside the ceramic slurry coat is then subjected to a firing process wherein the wax is removed leaving behind a ceramic mold. Molten metal may then be poured into the ceramic mold to create a desired metal component. As noted above, the component can be a turbine component such as, for example, a turbine airfoil.

Figure 1:
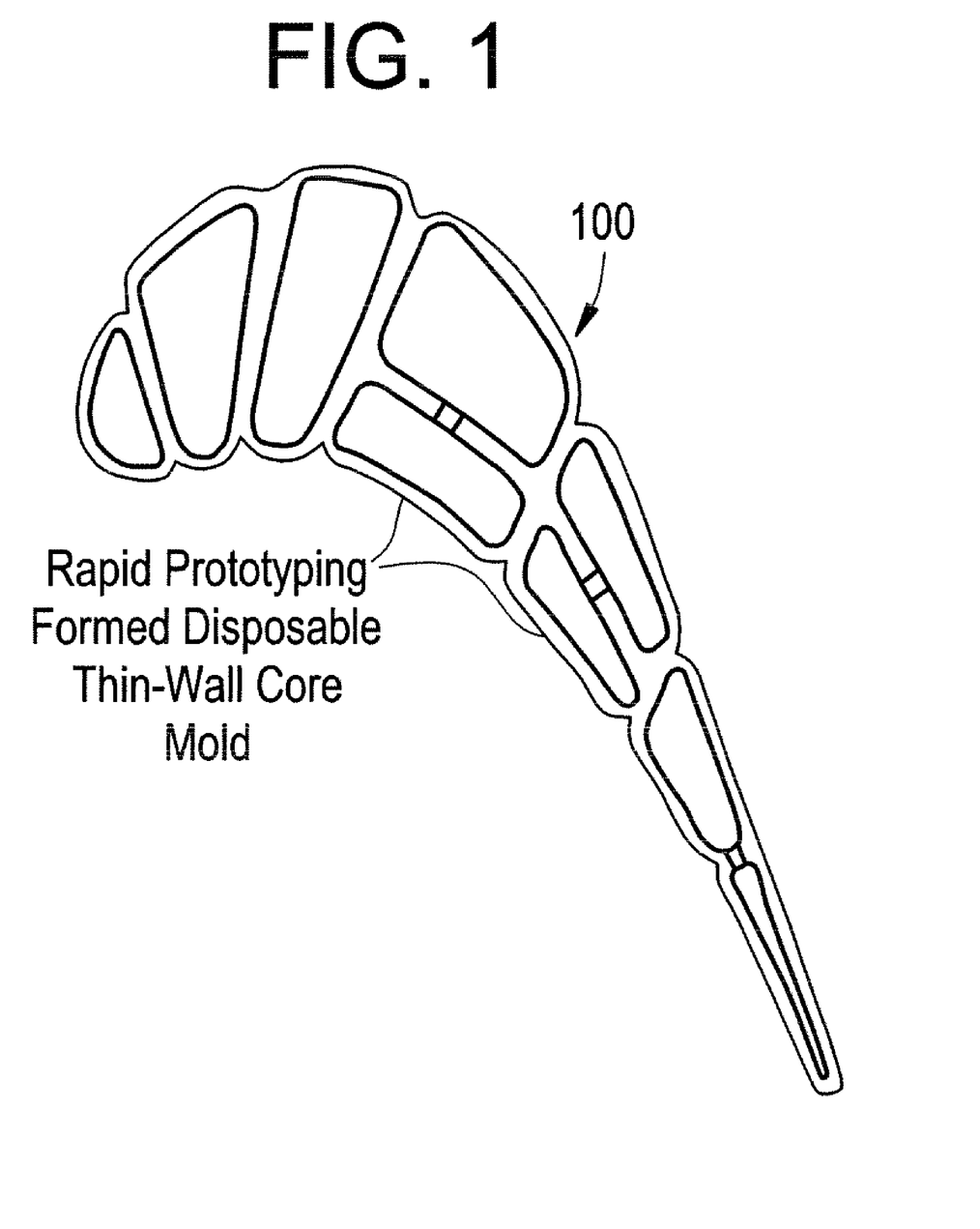
FIG. 1 depicts an exemplary embodiment of a thin wall disposable core die that can be used to manufacture a turbine airfoil.
Figure 2:
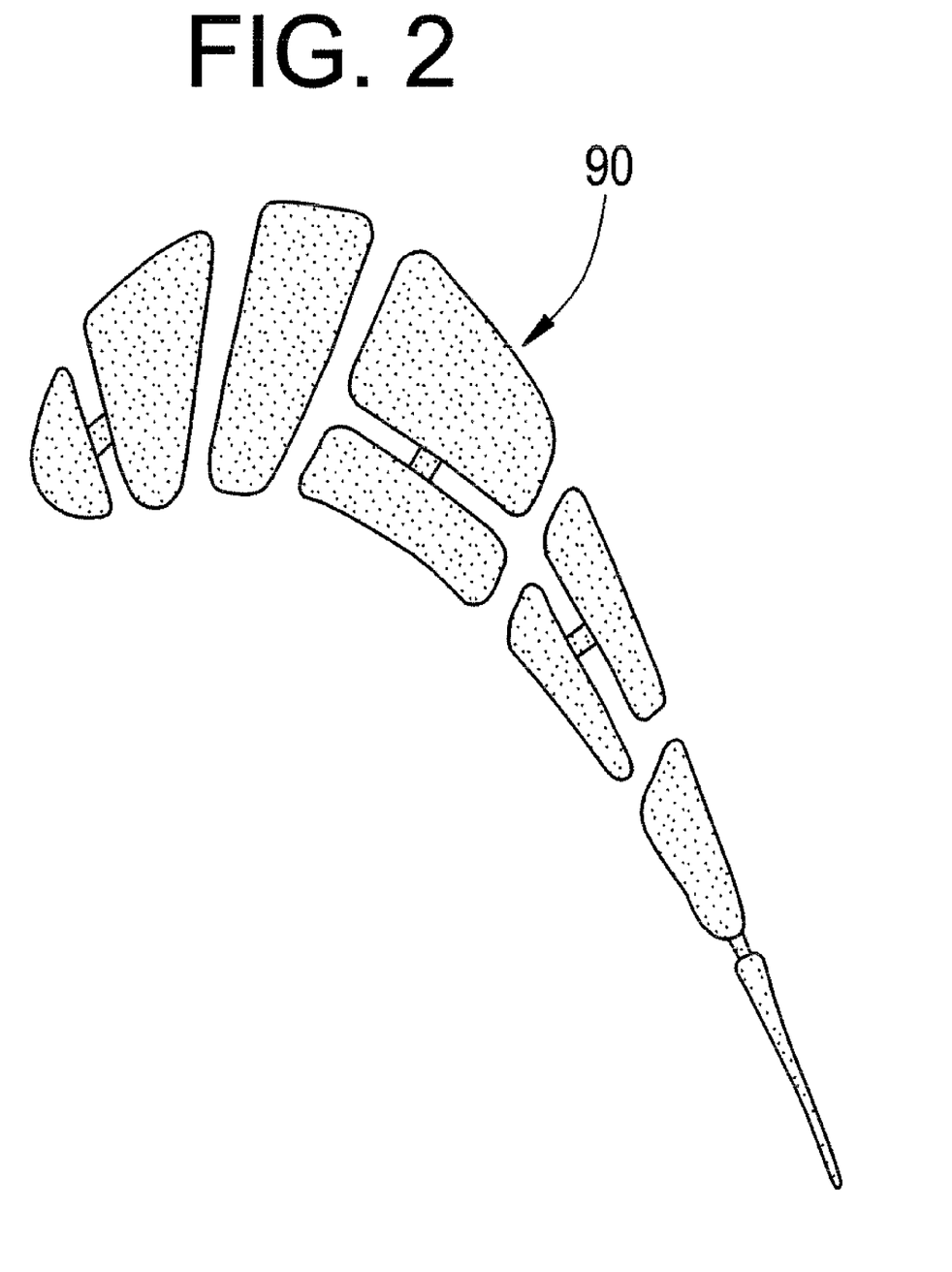
FIG. 2 depicts a cured ceramic core after being fired to form a solidified ceramic core.

FIG. 1 depicts one embodiment of an exemplary thin wall disposable core die 100 that can be used to manufacture a turbine airfoil. As noted above, a slurry comprising ceramic particles is then introduced into the interstices and channels of the thin wall disposable core die 100. Details of the slurry can be found in U.S. application Ser. Nos. 10/675,374 and 11/256,823 the entire contents of which are hereby incorporated by reference. The slurry is then subjected to curing to form the cured ceramic core. The thin wall disposable core die 100 is also removed to leave behind the cured ceramic core depicted in the FIG. 2. FIG. 2 depicts the cured ceramic core after being fired to form a solidified ceramic core 90. The disposable core die may be removed using chemical, thermal, mechanical methods or a combination comprising at least one of the foregoing methods. Examples of such methods include chemical dissolution, chemical degradation, mechanical abrasion, melting, thermal degradation or a combination comprising at least one of the foregoing methods of removing.

The ceramic core is then subjected to firing at a temperature of about 1000 to about 1700° C. depending on the core composition to form the solidified ceramic core 90. An exemplary temperature for the firing is about 1090 to about 1150° C.

Figure 3:
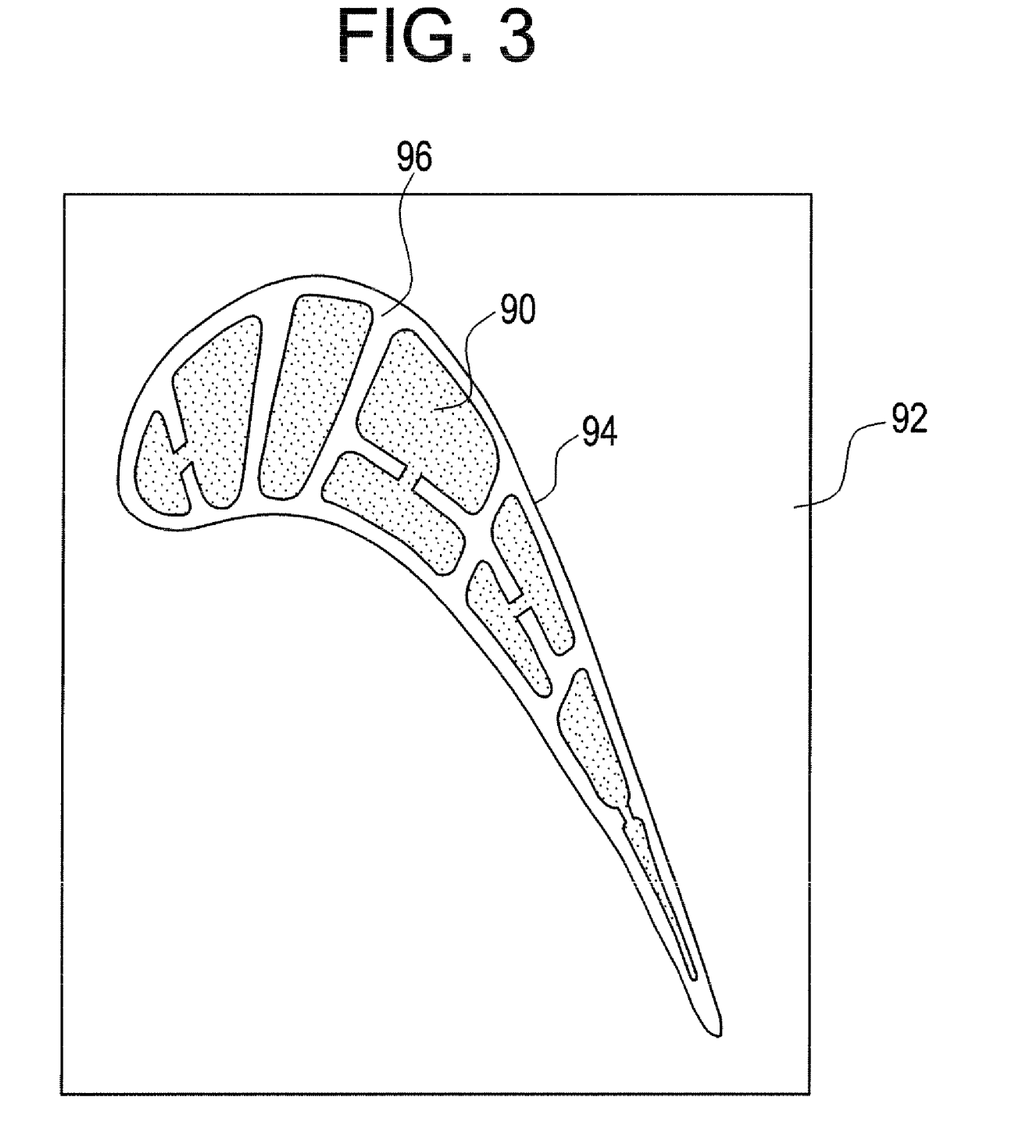
FIG. 3 depicts a wax die that includes the solidified ceramic core.
Figure 4:
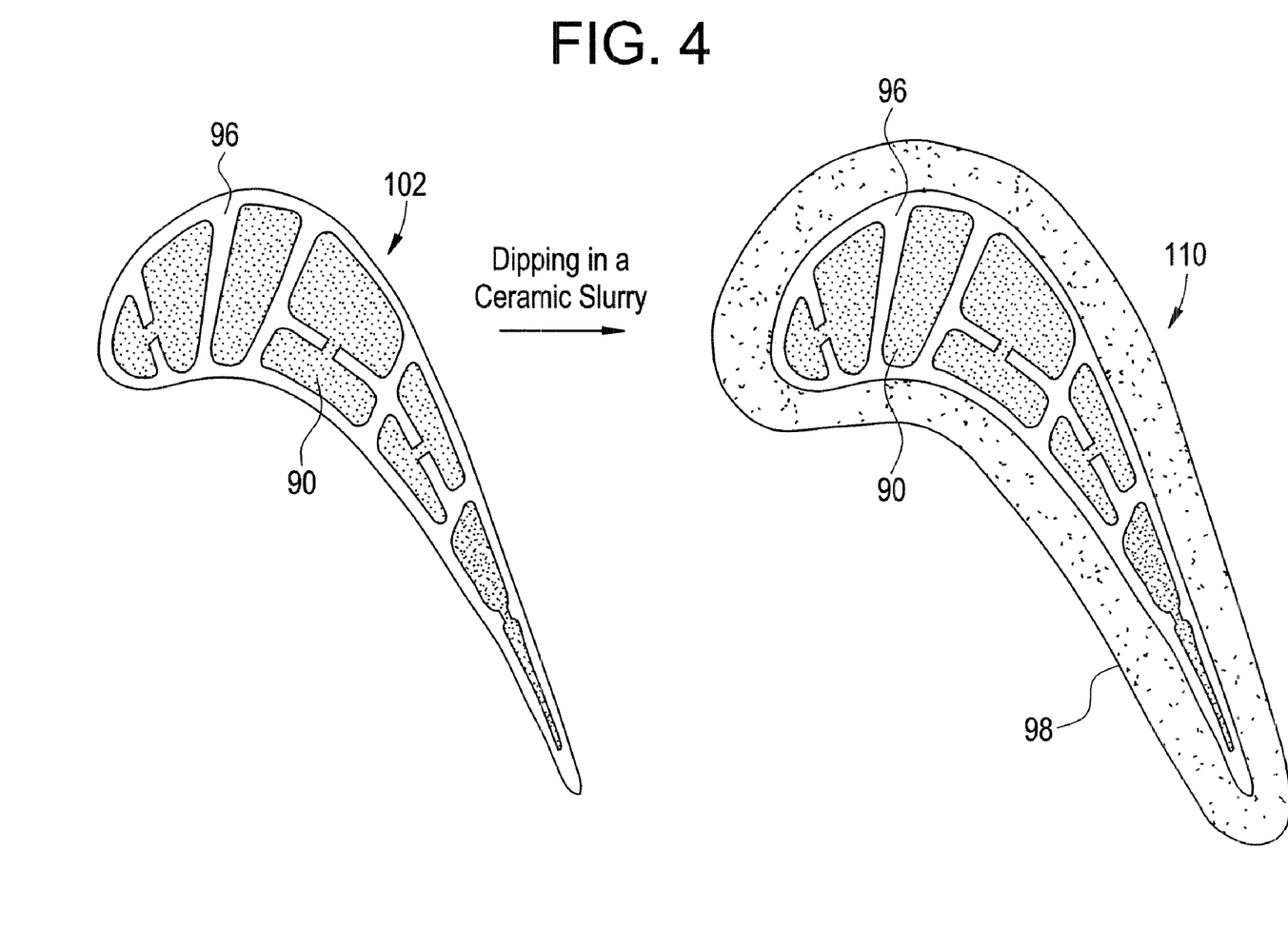
FIG. 4 depicts a ceramic shell created by the immersion of a wax airfoil in a ceramic slurry.
Figure 5:
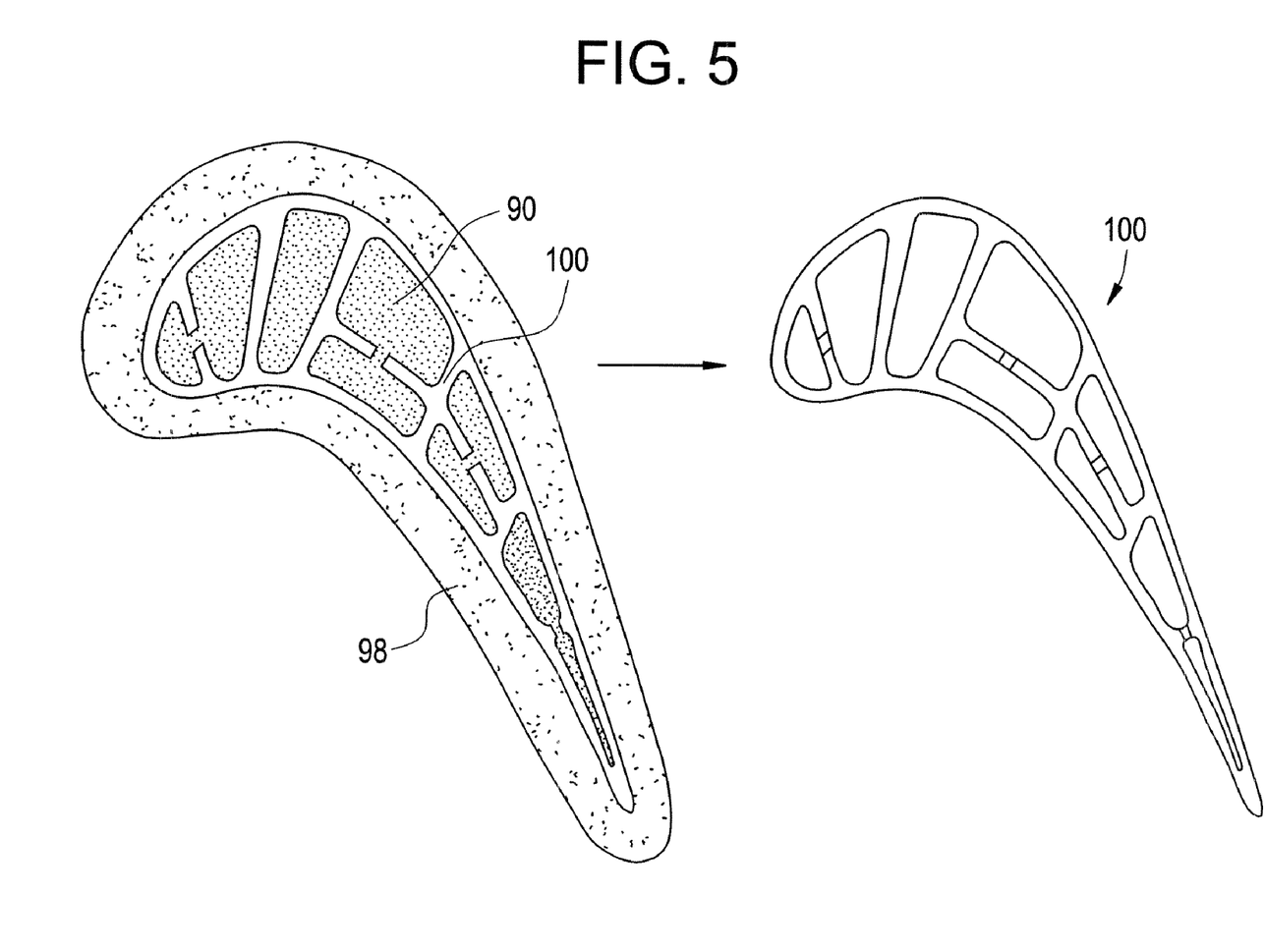
FIG. 5 is an exemplary depiction showing the airfoil (molded component) after removal of the ceramic shell and the integral casting core.

With reference now to the FIG. 3, the solidified ceramic core 90 is then inserted into a wax die 92. The wax die 92 has an inner surface 94 that corresponds to the desired outer surface of the turbine airfoil. Molten wax 96 is then poured into the wax die as shown in the FIG. 3. Upon solidification of the wax, the wax airfoil 102 shown in the FIG. 4 is removed from the wax die 92 and repeatedly immersed in a ceramic slurry to create a ceramic shell 98 as seen in the FIGS. 4 and 5. The wax present in the wax airfoil 102 is then removed by melting it and permitting it to flow out of the ceramic shell 98 that comprises the solidified ceramic core 90. After the wax is removed, a molten metal may be poured into the ceramic shell 98 that comprises the solidified ceramic core 90. In an exemplary embodiment, a molten metal is poured into the ceramic shell 98 to form the airfoil as depicted in the FIG. 5. FIG. 5 shows the ceramic shell 98 after the molten metal is disposed in it. Following the cooling and solidification of the metal, the ceramic shell 98 is broken to remove the desired airfoil. The solidified ceramic core is then removed from the desired airfoil via chemical leaching.

As noted above, the thin wall disposable core die is generally manufactured from a casting composition that comprises an organic polymer. The organic polymer can be selected from a wide variety of thermoplastic polymers, thermosetting polymers, blends of thermoplastic polymers, or blends of thermoplastic polymers with thermosetting polymers. The organic polymer can comprise a homopolymer, a copolymer such as a star block copolymer, a graft copolymer, an alternating block copolymer or a random copolymer, ionomer, dendrimer, or a combination comprising at least one of the foregoing types of organic polymers. The organic polymer may also be a blend of polymers, copolymers, terpolymers, or the like, or a combination comprising at least one of the foregoing types of organic polymers. The disposable core die is generally manufactured in a rapid prototyping process.

Examples of suitable organic polymers are natural and synthetic waxes and fatty esters, polyacetals, polyolefins, polyesters, polyaramides, polyarylates, polyethersulfones, polyphenylene sulfides, polyetherimides, polytetrafluoroethylenes, polyetherketones, polyether etherketones, polyether ketone ketones, polybenzoxazoles, polyacrylics, polycarbonates, polystyrenes, polyamides, polyamideimides, polyarylates, polyurethanes, polyarylsulfones, polyethersulfones, polyarylene sulfides, polyvinyl chlorides, polysulfones, polyetherimides, or the like, or a combinations comprising at least one of the foregoing polymeric resins.

Blends of organic polymers can be used as well. Examples of suitable blends of organic polymers include acrylonitrile-butadiene styrene, acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations comprising at least one of the foregoing blends of organic polymers.

Exemplary organic polymers are acrylonitrile-butadiene styrene (ABS), natural and synthetic waxes and fatty esters, and ultraviolet (UV)) cured acrylates. Examples of suitable synthetic waxes are n-alkanes, ketones, secondary alcohols, beta-diketones, monoesters, primary alcohols, aldehydes, alkanoic acids, dicarboxylic acids, omega-hydroxy acids having about 10 to about 38 carbon atoms. Examples of suitable natural waxes are animal waxes, vegetal waxes, and mineral waxes, or the like, or a combination comprising at least one of the foregoing waxes. Examples of animal waxes are beeswax, Chinese wax (insect wax), Shellac wax, whale spermacetti, lanolin, or the like, or a combination comprising at least one of the foregoing animal waxes. Examples of vegetal waxes are carnauba wax, ouricouri wax, jojoba wax, candelilla wax, Japan wax, rice bran oil, or the like, or a combination comprising at least one of the foregoing waxes. Examples of mineral waxes are ozocerite, Montan wax, or the like, or a combination comprising at least one of the foregoing waxes.

As noted above, the disposable core die can be manufactured from thermosetting or crosslinked polymers such as, for example, UV cured acrylates. Examples of crosslinked polymers include radiation curable or photocurable polymers. Radiation curable compositions comprise a radiation curable material comprising a radiation curable functional group, for example an ethylenically unsaturated group, an epoxide, and the like. Suitable ethylenically unsaturated groups include acrylate, methacrylate, vinyl, allyl, or other ethylenically unsaturated functional groups. As used herein, "(meth)acrylate" is inclusive of both acrylate and methacrylate functional groups. The materials can be in the form of monomers, oligomers, and/or polymers, or mixtures thereof. The materials can also be monofunctional or polyfunctional, for example di-, tri-, tetra-, and higher functional materials. As used herein, mono-, di-, tri-, and tetrafunctional materials refers to compounds having one, two, three, and four radiation curable functional groups, respectively.

Exemplary (meth)acrylates include methyl acrylate, tert-butyl acrylate, neopentyl acrylate, lauryl acrylate, cetyl acrylate, cyclohexyl acrylate, isobornyl acrylate, phenyl acrylate, benzyl acrylate, o-toluyl acrylate, m-toluyl acrylate, p-toluyl acrylate, 2-naphthyl acrylate, 4-butoxycarbonylphenyl acrylate, 2-methoxy-carbonylphenyl acrylate, 2-acryloyloxy-ethyl-2-hydroxypropyl phthalate, 2-hydroxy-3-phenoxypropyl acrylate, ethyl methacrylate, n-butyl methacrylate, sec-butyl methacrylate, isobutyl methacrylate, propyl methacrylate, isopropyl methacrylate, n-stearyl methacrylate, cyclohexyl methacrylate, 4-tert-butylcyclohexyl methacrylate, tetrahydrofurfuryl methacrylate, benzyl methacrylate, phenethyl methacrylate, 2-hydoxyethyl methacrylate, 2-hydroxypropyl methacrylate, glycidyl methacrylate, and the like, or a combination comprising at least one of the foregoing (meth)acrylates.

The organic polymer may also comprise an acrylate monomer copolymerized with another monomer that has an unsaturated bond copolymerizable with the acrylate monomer. Suitable examples of copolymerizable monomers include styrene derivatives, vinyl ester derivatives, N-vinyl derivatives, (meth)acrylate derivatives, (meth)acrylonitrile derivatives, (meth)acrylic acid, maleic anhydride, maleimide derivatives, and the like, or a combination comprising at least one of the foregoing monomers.

An initiator can be added to the casting composition in order to activate polymerization of any monomers present. The initiator may be a free-radical initiator. Examples of suitable free-radical initiators include ammonium persulfate, ammonium persulfate and tetramethylethylenediamine mixtures, sodium persulfate, sodium persulfate and tetramethylethylenediamine mixtures, potassium persulfate, potassium persulfate and tetramethylethylenediamine mixtures, azobis [2-(2-imidazolin-2-yl) propane] HCl (AZIP), and azobis(2-amidinopropane) HCl (AZAP), 4,4'-azo-bis-4-cyanopentanoic acid, azobisisobutyramide, azobisisobutyramidine.2HCl, 2-2'-azo-bis-2-(methylcarboxy)propane, 2-hydroxy-1-[4-(hydroxyethoxy)phenyl]-2-methyl-1-propanone, 2-hydroxy-2-methyl-1-phenyl-1-propanone, or the like, or a combination comprising at least one of the aforementioned free-radical initiators. Some additives or comonomers can also initiate polymerization, in which case a separate initiator may not be desired. The initiator can control the reaction in addition to initiating it. The initiator is used in amounts of about 0.005 wt % and about 0.5 wt %, based on the weight of the casting composition.

Other initiator systems, in addition to free-radical initiator systems, can also be used in the casting composition. These include ultraviolet (UV), x-ray, gamma-ray, electron beam, or other forms of radiation, which could serve as suitable polymerization initiators. The initiators may be added to the casting composition either during the manufacture of the casting composition or just prior to casting.

Dispersants, flocculants, and suspending agents can also be optionally added to the casting composition to control the flow behavior of the composition. Dispersants make the composition flow more readily, flocculants make the composition flow less readily, and suspending agents prevent particles from settling out of composition.

In one embodiment, the thin wall disposable core die is manufactured by rapid prototyping. Rapid prototyping takes virtual designs (from computer aided design (CAD) or from animation modeling software), transforms them into cross sections, still virtual, and then creates each cross section in physical space, one after the next until the model is finished. It is a WYSIWYG (what you see is what you get) process where the virtual model and the physical model correspond, almost identically.

In additive fabrication, the machine reads in data from a CAD drawing, and lays down successive layers of liquid or powdered material, and in this way builds up the thin wall disposable core die from a series of cross sections. These layers, which correspond to the virtual cross section from the CAD model, are glued together or fused (often using a laser) automatically to create the final shape. The primary advantage to additive construction is its ability to create almost any geometry (excluding trapped negative volumes). A large number of thin wall disposable core dies can also be manufactured in parallel if desired. In an exemplary embodiment, the thin wall disposable core die is created from the UG (UNIGRAPHICS®) model of the ceramic core by offsetting the boundary to account for the desirable reduced thickness.

As noted above, the thin wall disposable core die has an average wall thickness of about 0.5 to about 10 millimeters, specifically about 2 to about 8 millimeters, and more specifically about 3 to about 7 millimeters. When photopolymers are used to manufacture the thin wall disposable core die, the average wall thickness is about 1.5 millimeters to about 3.5 millimeters. When wax is used to manufacture the thin wall disposable core die, the average wall thickness is about 4.5 to about 7.5 millimeters.

In an exemplary embodiment, the average wall thickness of a thin wall disposable core die is about 10% to about 20% of the average wall thickness of other commercially used metal core dies. In an exemplary embodiment, the average wall thickness of a thin wall disposable core die is about 15% of the average wall thickness of other commercially used metal core dies.

The viscosity of the slurry used for forming a ceramic core in the thin wall disposable core die is about 1 to about 1,000 Pascal-seconds at room temperature when tested at a shear rate of up to 70 seconds$^{-1}$ and a flow index of less than 0.6. An exemplary viscosity for the slurry is about 500 Pascal-seconds at room temperature when tested at a shear rate of up to 70 seconds$^{-1}$.

It is also desirable for the slurry to have a cure temperature that is less than the melting point or the degradation temperature of thin wall disposable core die. In one embodiment, it is desirable for the slurry to undergo up to about 90 mole percent (mol %) curing at a temperature of less than or equal to about 50° C., specifically less than or equal to about 30° C., and more specifically less than or equal to about 20° C. In another embodiment, it is desirable for the slurry to undergo up to about 95 mol % curing at a temperature that is less than or equal to about 50° C., specifically less than or equal to about 30° C., and more specifically less than or equal to about 20° C. In yet another embodiment, it is desirable for the slurry to undergo up to about 98 mol % curing at a temperature that is less than or equal to about 50° C., specifically less than or equal to about 30° C., and more specifically less than or equal to about 20° C.

In one embodiment, it is desirable for the slurry to have a shrinkage of less than or equal to about 1 volume percent (vol %), specifically less than or equal to about 0.75 vol %, more specifically less than or equal to about 0.5 vol %, upon undergoing up to about 90 mol % curing. In another embodiment, it is desirable for the slurry to have a shrinkage of less than or equal to about 1 vol %, specifically less than or equal to about 0.75 vol %, more specifically less than or equal to about 0.5 vol %, upon undergoing up to about 95 mol % curing. In yet another embodiment, it is desirable for the slurry to have a shrinkage of less than or equal to about 1 vol %, specifically less than or equal to about 0.75 vol %, more specifically less than or equal to about 0.5 vol %, upon undergoing up to about 98 mol % curing.

The hydrostatic pressure applied to the slurry prior to the curing process to create the ceramic core is generally about 0.07 to about 7 kilogram-force per square centimeter (kg/cm$^2$), specifically about 0.1 to about 6 kg/cm$^2$, more specifically about 0.5 to about 5.5 kg/cm$^2$, and more specifically about 1 to about 5 kg/cm$^2$. In one embodiment, the thin wall disposable core die has an elastic modulus effective to restore the wall to its original position after the removal of the hydrostatic pressure. In another embodiment, the thin wall disposable core die has an elastic modulus effective to prevent permanent deformation of the wall upon the application of the hydrostatic pressure.

The thin wall disposable core die has a number of advantages. They can be mass-produced and used in casting operations for the manufacture of turbine airfoils. The thin wall disposable core die can be manufactured in simple or complex shapes and mass-produced at a low cost. The use of a thin wall disposable core die can facilitate the production of the ceramic core without added assembly or manufacturing. The use of a thin wall disposable core die can eliminate the use of core assembly for producing turbine airfoils.

Since the amount of the rapid prototyping material required to form the thin wall disposable core die is small, the process will be much faster than the thick wall core die design. The thin wall disposable core die removal process will also be faster when compared with the removal of the thick-wall disposable core die. The use of the thin wall disposable core die can therefore achieve the faster turn around time and lower the manufacturing cost.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method comprising:
injecting into a thin wall disposable core die a slurry having a viscosity of about 1 to about 1,000 Pascal-seconds at room temperature when tested at a shear rate of up to 70 seconds$^{-1}$ and a flow index of less than 0.6; the injecting being carried out at a hydrostatic pressure of about 0.07 to about 7 kilograms per centimeter square; wherein the thin wall disposable core die has an average wall thickness of about 1.5 to about 10 millimeters;
restoring the thin wall disposable core die to its original position upon the removal of the hydrostatic pressure;
curing the slurry to form a cured ceramic core;
removing the thin wall disposable core die from the cured ceramic core; and
firing the cured ceramic core to form a solidified ceramic core.

2. The method of claim 1, wherein the thin wall disposable core die has an average wall thickness of about 2 to about 8 millimeters.

3. The method of claim 1, further comprising disposing the solidified ceramic core in a wax die; wherein the wax die comprises a metal.

4. The method of claim 3, further comprising injecting wax between the solidified ceramic core and the wax die.

5. The method of claim 4, further comprising cooling the injected wax to form a
wax component with the solidified ceramic core enclosed therein.

6. The method of claim 5, further comprising immersing the wax component into a slurry; wherein the slurry comprises ceramic particles.

7. The method of claim 6, further comprising subjecting the wax component to a firing process to create a ceramic outer shell.

8. The method of claim 7, further comprising removing the wax from the wax component during the firing process.

9. The method of claim 7, further comprising disposing molten metal into the ceramic outer shell to form a desired metal component.

10. The method of claim 9, wherein the metal component is an airfoil.

* * * * *